(12) United States Patent
Viaud

(10) Patent No.: US 7,578,119 B2
(45) Date of Patent: Aug. 25, 2009

(54) ROUND BALER UNLOADING APPARATUS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/761,461

(22) Filed: Jun. 12, 2007

(65) Prior Publication Data

US 2008/0041028 A1 Feb. 21, 2008

(30) Foreign Application Priority Data

Aug. 16, 2006 (DE) ................ 10 2006 038 299

(51) Int. Cl.
*A01D 39/00* (2006.01)
*B30B 5/06* (2006.01)

(52) U.S. Cl. .......................... 56/341; 100/88
(58) Field of Classification Search .......... 56/341, 56/474–480, 473.5; 100/88
See application file for complete search history.

(56) References Cited

U.S. PATENT DOCUMENTS

| | | | | |
|---|---|---|---|---|
| 2,285,375 A * | 6/1942 | Hansen | ................ | 68/212 |
| 3,974,632 A * | 8/1976 | Van der Lely | ................ | 56/341 |
| 4,077,315 A * | 3/1978 | Meiers | ................ | 100/88 |
| 4,101,081 A * | 7/1978 | Ritter et al. | ................ | 241/101.74 |
| 4,206,587 A * | 6/1980 | Freimuth et al. | ................ | 56/341 |
| 4,458,587 A * | 7/1984 | Jennings | ................ | 100/88 |
| 4,566,380 A * | 1/1986 | Clostermeyer et al. | ................ | 100/89 |
| 4,683,815 A * | 8/1987 | Van Ryswyk | ................ | 100/88 |
| 4,798,044 A * | 1/1989 | Viaud et al. | ................ | 56/341 |
| 4,821,637 A * | 4/1989 | Viaud | ................ | 100/88 |
| 5,192,177 A * | 3/1993 | Cardinal | ................ | 414/501 |
| 5,760,344 A * | 6/1998 | Esken et al. | ................ | 177/136 |
| 5,768,986 A * | 6/1998 | Arnold et al. | ................ | 100/88 |
| 5,822,967 A * | 10/1998 | Hood et al. | ................ | 56/341 |
| 6,134,870 A * | 10/2000 | Lippens et al. | ................ | 56/432 |
| 6,402,672 B2 * | 6/2002 | Mornet et al. | ................ | 492/45 |
| 6,892,632 B1 * | 5/2005 | Viesselmann et al. | ................ | 100/99 |
| 6,969,315 B2 * | 11/2005 | Richman et al. | ................ | 460/119 |
| 2001/0003236 A1 * | 6/2001 | Viaud | ................ | 53/589 |
| 2004/0020376 A1 * | 2/2004 | Bentzinger et al. | ................ | 100/177 |
| 2004/0103632 A1 * | 6/2004 | Derscheid et al. | ................ | 56/341 |
| 2004/0134177 A1 * | 7/2004 | Viaud | ................ | 56/341 |
| 2005/0188862 A1 * | 9/2005 | Hoover et al. | ................ | 100/87 |
| 2005/0217233 A1 * | 10/2005 | Smith et al. | ................ | 56/341 |
| 2005/0217506 A1 * | 10/2005 | Meeks et al. | ................ | 100/88 |

FOREIGN PATENT DOCUMENTS

| | | |
|---|---|---|
| EP | 1 438 889 | 7/2004 |
| EP | 1 832 157 | 9/2007 |

OTHER PUBLICATIONS

European Search Report, Jan. 22, 2008, 6 Pages.

* cited by examiner

*Primary Examiner*—Thomas B Will
*Assistant Examiner*—Joan D Misa

(57) ABSTRACT

A round baler has an unloading apparatus downstream of a bale chamber provided with movable carrying elements, for example rollers, belts, etc., so that a round bale discharged in rotating motion from the bale chamber is able to maintain its spin and twine wound onto it does not fall off again. To prevent the rotary motion of the round bale from being slowed or even terminated upon transfer to the unloading apparatus, stationary portions of a superstructure of the round baler, for example, a cross-stay serving as an axle, are covered by a movable cover.

11 Claims, 6 Drawing Sheets

ROUND BALER UNLOADING APPARATUS

FIELD OF THE INVENTION

The invention relates to a round baler comprising a superstructure, a bale chamber and a thereto adjoining unloading apparatus having at least one carrying element between the bale chamber and a ground surface, which carrying element permits a rolling motion of the round bale.

BACKGROUND OF THE INVENTION

Whenever a round bale is unloaded from the bale chamber of a round baler, the problem of controlling its motion always presents itself. If the round bale falls to roll far enough away from the round baler, the discharge gate cannot be lowered and the bale chamber cannot be closed. If the round bale has too much momentum, it rolls uncontrollably onwards and down a slope, for example, it is slowed too much upon discharge from the bale chamber, it remains stuck on an axle or other cross-stays and does not roll down the ramp, or its direction of rotation reverses and twine which is wound thereon falls off from the down-rolling round bale.

U.S. Pat. No. 4,683,815 A discloses a round baler having a ramp, on whose top side driven conveyor chains operate which transport the round bale securely away from the bale chamber.

From round balers of the company WELGER, it is additionally known to provide a vertically pivotable ramp at the outlet of the bale chamber and behind an axle which is provided with transversely disposed rollers and is thus intended to maintain the "spin" of the emerging round bale, so that the twine does not fall off. This effect only occurs, however, if the spin is still present as the bale is discharged.

The problem on which the invention is founded lies in the perception that there is no solution which prevents the twine from falling off due to the inversely rolling round bale and ensures a secure discharge of the round bale.

SUMMARY OF THE INVENTION

According to the present invention, there is provided a large round baler having a bale unloading apparatus constructed for overcoming the aforementioned drawbacks of known bale unloading apparatuses.

An object of the invention is to provide a bale unloading apparatus having at least one moveable element which moves so as not to impede the rolling motion imparted to a bale being discharged from the bale chamber of the baler.

In this way, the round bale which is still rotating upon discharge from the bale chamber does not come into contact with stationary parts of the superstructure, is not therefore slowed and maintains its spin, which is counter-directed to an unrolling of the twine. The relevant part of the superstructure can be the axle for the running wheels, a stay, guide plates for the net, hydraulic components and the like, which could exert a slowing effect upon the round bale in the event of contact. However, other fixed parts, for example of a binding apparatus, of the bale chamber, of the unloading apparatus, etc., which do not form part of the superstructure could also be covered. As defined in the dependent patent claims, the cover can also be very differently configured, the essential point being that the motion of the cover maintains the motion of the round bale. The motion could both be derived from the motion of the round bale and be actively generated, for example by a motor or a drive connection to driven parts of the round baler. Moreover, the motion of the cover could be controlled in order to generate the optimal rotation speed and, possibly, the direction of rotation of the round bale.

Since the side parts of the round baler are constantly connected by relatively large transverse-running stays, of which, according to function, the axle for the running wheels also forms part, there is always the danger there that the round bale makes contact and is slowed. Although rollers—generally of a small diameter—could be fitted on or around the cross-stay, the use of a large-diameter tube, which receives the cross-stay or the axle within it, appears simpler and more effective. This tube could consist of metal as well as of plastic and would preferably be smooth.

The tube is simple to fit if it is divided at least once in its longitudinal direction and can be securely rejoined. The closure can be made by collars, screws or the like. On the other hand, the tube could consist of a plurality of arc segments which are screwed or otherwise fastened onto annular brackets.

The mounting of the tube on plain or roller bearings ensures that no slowing effect derives from the tube itself. Depending on the length of the tube, a plurality of bearings can be provided or one or more long rollers or shafts can even be provided between the cross-stay and the inner side of the tube, which support the tube in a low-friction manner.

The spin of the round bale, i.e. its originally inherent rotary motion, is also maintained en route to being deposited on the ground, if it can continue rolling, for example on rollers. Rollers can be very stably configured and can be mounted for free rotation, are low in maintenance and cost-effective.

In usage conditions in which short crop, for example crumbling straw, can be expected, which could block clearances between adjacent rollers, it is sensible to use a substantially closed conveyor surface as the carrying element, for example a continuous belt, or a belt whose ends are connected to one another. Such a belt can be configured as wide as the round bale or, indeed, narrower, as long as it is ensured that the round bale can continue to rotate and cannot lean noticeably against stationary parts. The belt can be closed over the whole of its surface, or even perforated, smooth or profiled, and a tensioning apparatus can be provided, which keeps the strands always as straight as possible. Depending on the length of the belt, supporting rollers can also be used in between. In place of a belt, another traction means, for example a rod conveyor, can also be used.

The carrying element can also be configured as shown in U.S. Pat. No. 4,683,815, the conveyor chain which is shown there also being able to be replaced by a conveyor belt or rolling bodies—the essential aspect being merely that a fundamentally rigid ramp is provided which bears the carrying elements. As rolling bodies, hard-plastic as well as metal rollers could be used. The carrying elements which are provided in this way can be made in both driven and non-driven configuration.

On the one hand, the unloading apparatus having the carrying element(s) could be configured as an independent and complete unit, which is merely attached to the superstructure of the round baler, on the other hand, the carrying element of the unloading apparatus could also be wrapped around a roller situated on the superstructure or the bale chamber. A gap between the cover and the carrying elements. In which crop could gather, is thereby prevented. This has the effect, furthermore, that as the round bale is ejected, the carryig element is driven, i.e. moved, which transmits itself, in turn, to the round bale. Although such a drive mechanism is known from U.S. Pat. No. 3,974,632, in this case no round bale, but rather a stack of harvested crop, is discharged from a chamber.

In order to prevent damage to the unloading apparatus through contact with the ground, a stop is provided, so that the free end of its frame always keeps a distance to the ground.

The use of a, in particular, resilient bumper at the delivery end of the frame enables the round bale to be prevented from rolling back in the direction of the bale chamber. The resilience makes it possible to roll the round bale gradually onto the ground from the ends of the frame which are distanced from the ground, instead of letting it fall. As soon as the round bale is deposited, the bumper(s) spring(s) upwards and come(s) to bear against the periphery of the round bale.

BRIEF DESCRIPTION OF THE DRAWINGS

More closely described illustrative embodiments of an unloading apparatus and of a cover on a round baler are represented below in the drawing, in which.

DESCRIPTION OF THE PREFERRED EMBODIMENT

Figure 1:
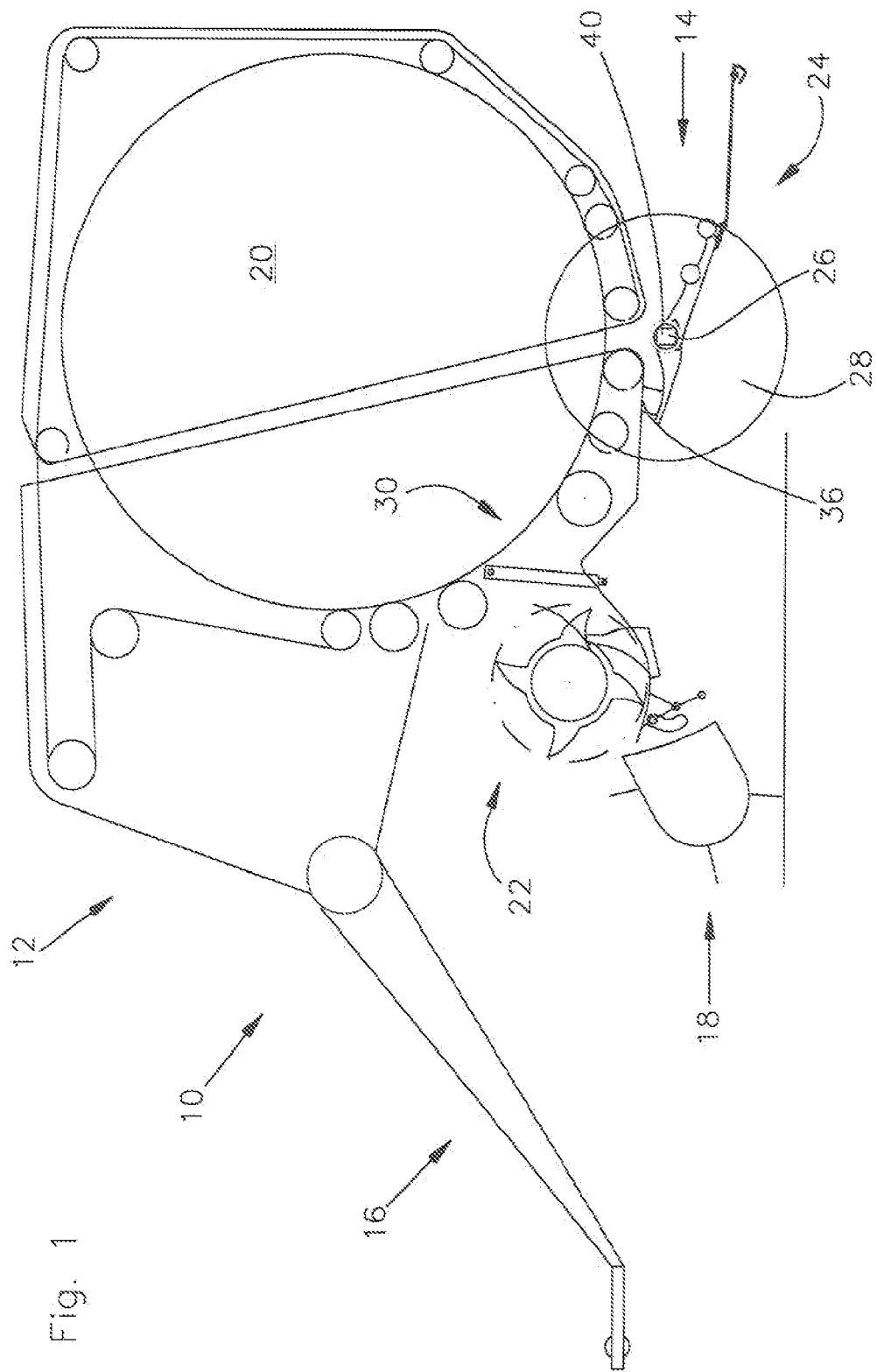
FIG. 1 is diagrammatic, left side view of a round baler equipped with an unloading apparatus including a cover.

A round baler 10 shown in FIG. 1 is of standard construction, i.e. it has a superstructure 12, a chassis 14, a drawbar 16, a crop receiver 18, a bale chamber 20 and a feed apparatus 22. In addition, an unloading apparatus 24 and a cover 40 are provided, which differ, however, from the prior art or are unknown there.

The round baler 10 is represented as a drawn round baler 10 having a size-variable bale chamber 20; it could equally well be a self-propelling round baler 10 and/or one having a constant-size bale chamber 20, the type of (non-detailed) press elements being immaterial.

The superstructure 12 rests on the chassis 14 and bears the crop receiver 18, the feed apparatus 22 and the unloading apparatus 24 and forms the bale of chamber 20 between (non-detailed) single-part of multipart side walls.

the chassis 14 contains a rigidly or resiliently fitted cross-stay 26, which at the same time serves as an axle for wheels 28.

The drawbar 16 is connected in a rigid or a vertically pivotable manner to the superstructure 12 and serves for the connection to a towing vehicle (not shown).

The crop receiver 18 is also referred to as a pick-up and is connected in a vertically movable manner to the superstructure 12, as is likewise known.

The bale chamber 20, at a front, lower region, has an inlet 30 for the feed crop, which connects directly to the feed apparatus 22.

The feed apparatus 22 can be rigidly or movably connected to the crop receiver 18 or the superstructure 12 and contains, inter alia, in a non-detailed manner, a feed rotor, a feed channel wall, blades and the like. The feed apparatus 22 has the function of accepting crop brought up from the crop receiver 18 and of transporting it cut or uncut into the bale chamber 20.

Figure 2:
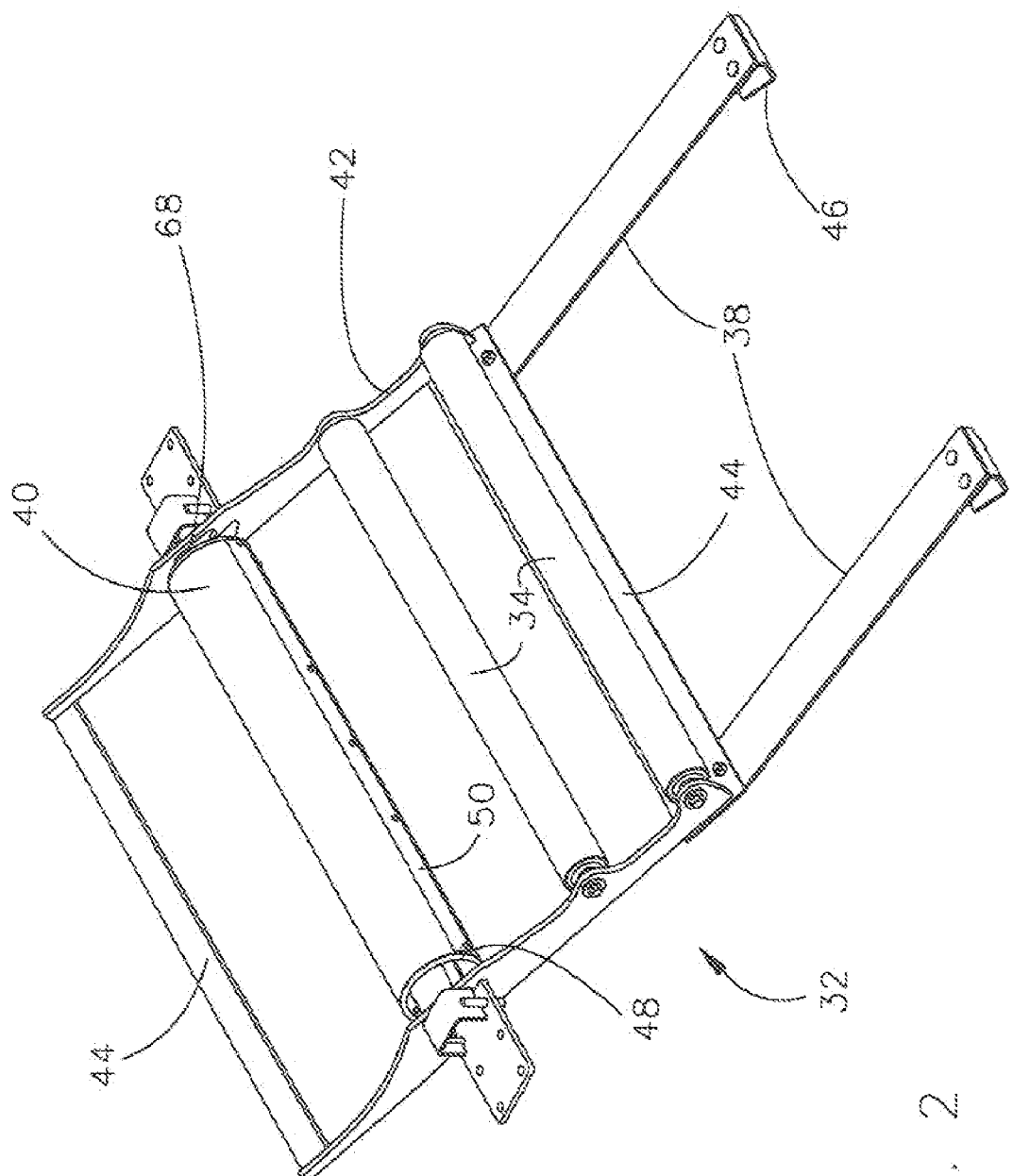
FIG. 2 is a left, rear perspective view of the unloading apparatus shown in FIG. 1.

Referring now also to FIG. 2, it can be seen that the unloading apparatus 24 comprises a frame 32, carrying elements 34, a stop 36 and one or more bumpers 38. In addition, a cylindrical tubular cover 40 is provided, which, depending on the illustrative embodiment, lies adjacent to the unloading apparatus 24 or is part of the latter.

The unloading apparatus 24 has the function of making a round bale released from the bale chamber 20 roll gradually onto the ground. For this purpose, it is connected to the superstructure 12 in a vertically pivotable or rigid manner, depending on the size of the wheels 28. In the shown illustrative embodiment, a pivotable unloading apparatus 24 is assumed, which is located in an upper position during the pressing operation of the round baler 10 and a lower position during its unloading operation, as is known per se however. In the case of a vertically pivotable unloading apparatus 24, suitable apparatuses (not shown), for example springs, rods, control surfaces on the discharge gate of the round baler or the like are provided to bring the unloading apparatus 24 back into the upper position. In the case of a vertically rigid unloading apparatus 24, there is no need for the stop 36.

Figure 6:
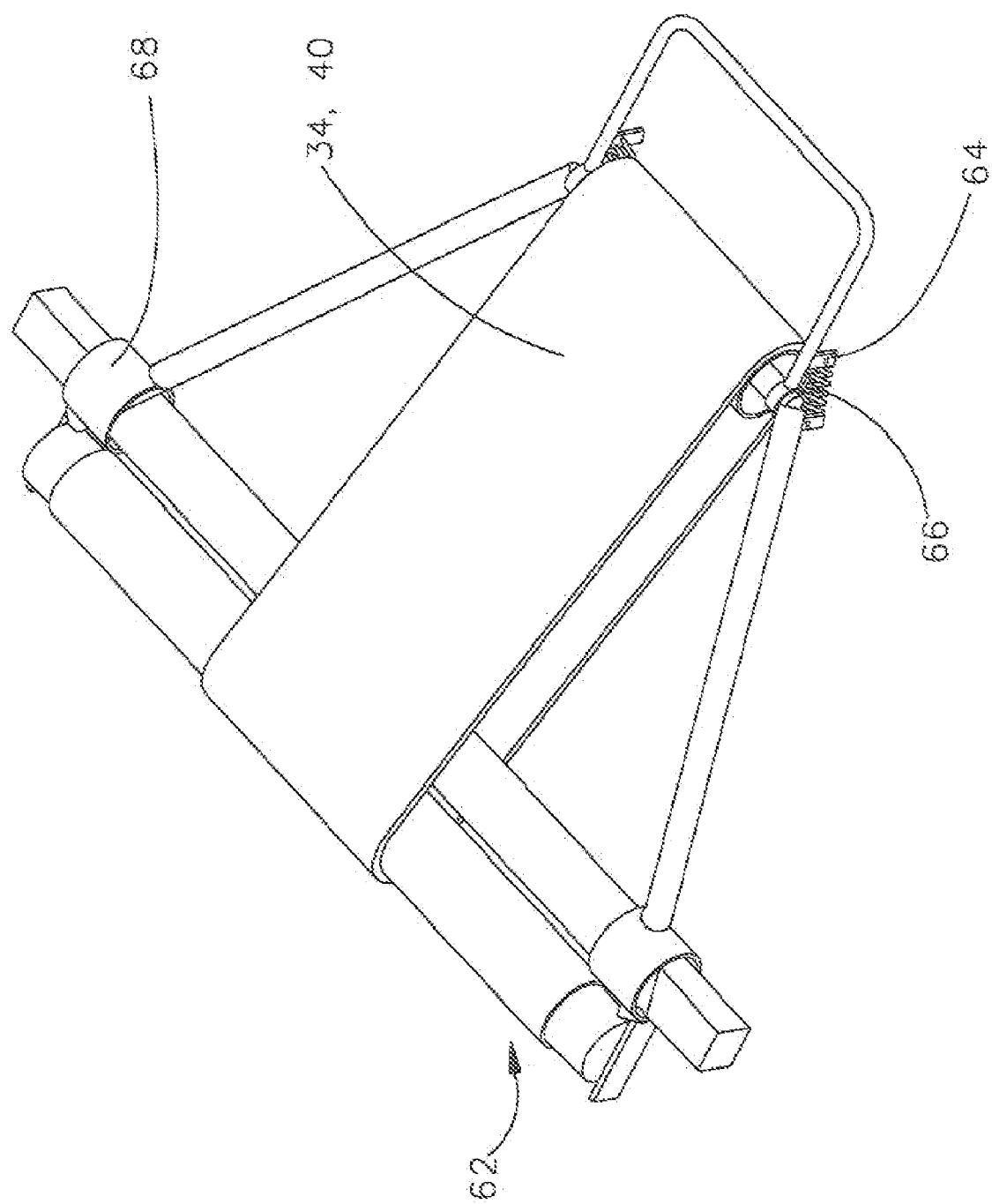
FIG. 6 is a view similar to that of FIG. 5 but showing a fourth embodiment wherein the cover is mounted to a roller located in front of the axle.

The frame 32 includes on each side a side plate 42, which side plates are spaced apart in the transverse direction by the greatest part of the width of the bale chamber 20 and are mutually stiffened by means of stays 44. The side members 42 are mounted on the cross-stray 26 in a vertically pivotable manner by means of bearings 68, the bearings 68 being situated at approximately one-third of the length of the side members 42, measured from their front edge nearest to the drawbar 16. These bearings 68 can be configured according to choice, for example as sleeves, as is shown in FIG. 6.

In the present illustrative embodiment, the carrying elements 34 are configured as rollers, having opposite ends respectively rotatably mounted in the side members 42. The carrying elements 34 extend mainly parallel to the axis of the round bale to be supported and have a mutual clearance which is sufficiently small that no round bale can settle between the carrying elements. In addition to (see FIG. 2, for example), or instead of, (see FIG. 3, for example) the stays 44, the axles of the carrying elements 34 are used to stiffen the frame 32.

The stop 36 is in this case provided on the superstructure 12 and can be fitted both adjustably and rigidly. In the present illustrative embodiment, it is formed by a transversely running stay. The location of the stop 36 is chosen such that the bumper 38, in the lowered position of the unloading apparatus 24, when not laden with a bale, does not touch the ground.

The bumper(s) 38 is/are configured as leaf springs and has/have almost the length of the side members 42. In the shown illustrative embodiment, a bumper 38 is screwed to each side plate 42, to be precise at the spot where the rearward stay 44 is also fastened. Since the function of a bumper 38 mainly consists in preventing the round bale from rolling back, a single bumper 38, which could be fitted, for example, in the middle of the stay 44, is basically sufficient. At the free end of the bumper 38, a foot 46 is provided, which itself then continues to ensure a short distance of the bumper 38 to the ground when a round bale is resting on it. Similarly, a net material covering the circumference of the round bale is not damaged by a sharp edge of the bumper end, since the foot 46 offers a larger contact surface. The foot 46 is essentially configured as a horizontal "U", one arm of which is screwed to the bottom side of the bumper 38. As is shown, in particular, by a glance at FIG. 1, a bumper 38 does not constitute a rectilinear extension of the side plate 42, but runs angled-off slightly upwards relative to the latter. Although the bumper 38 exhibits a number of advantages, it is not necessary for the maintenance of the spin in the round bale.

Figure 3:
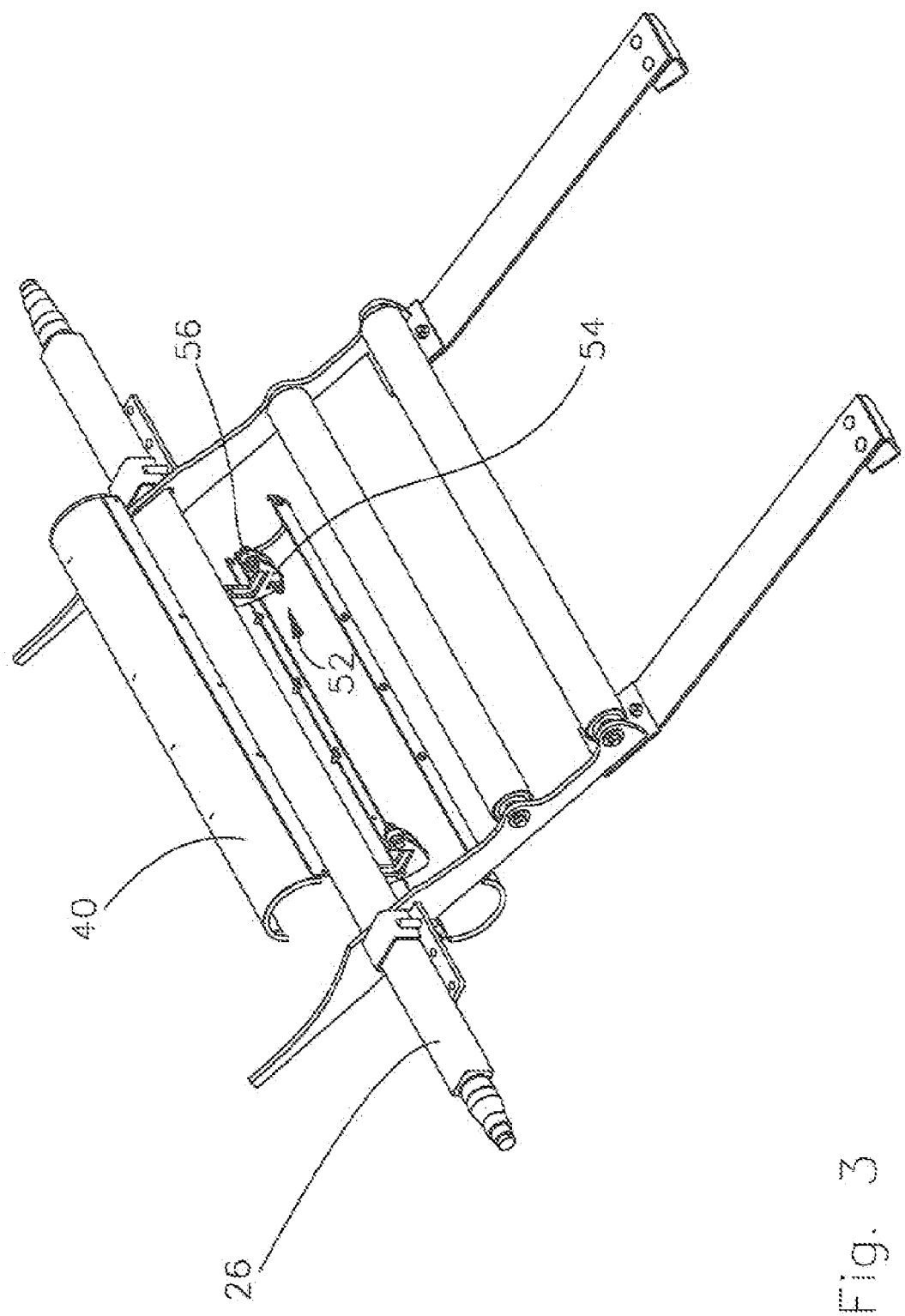
FIG. 3 is a view like FIG. 2, but showing the unloading apparatus mounted to a baler axle, according to a first embodiment, wherein the axle is round in cross section and showing opposite halves of the cover separated from each other and removed from the axle.
Figure 4:
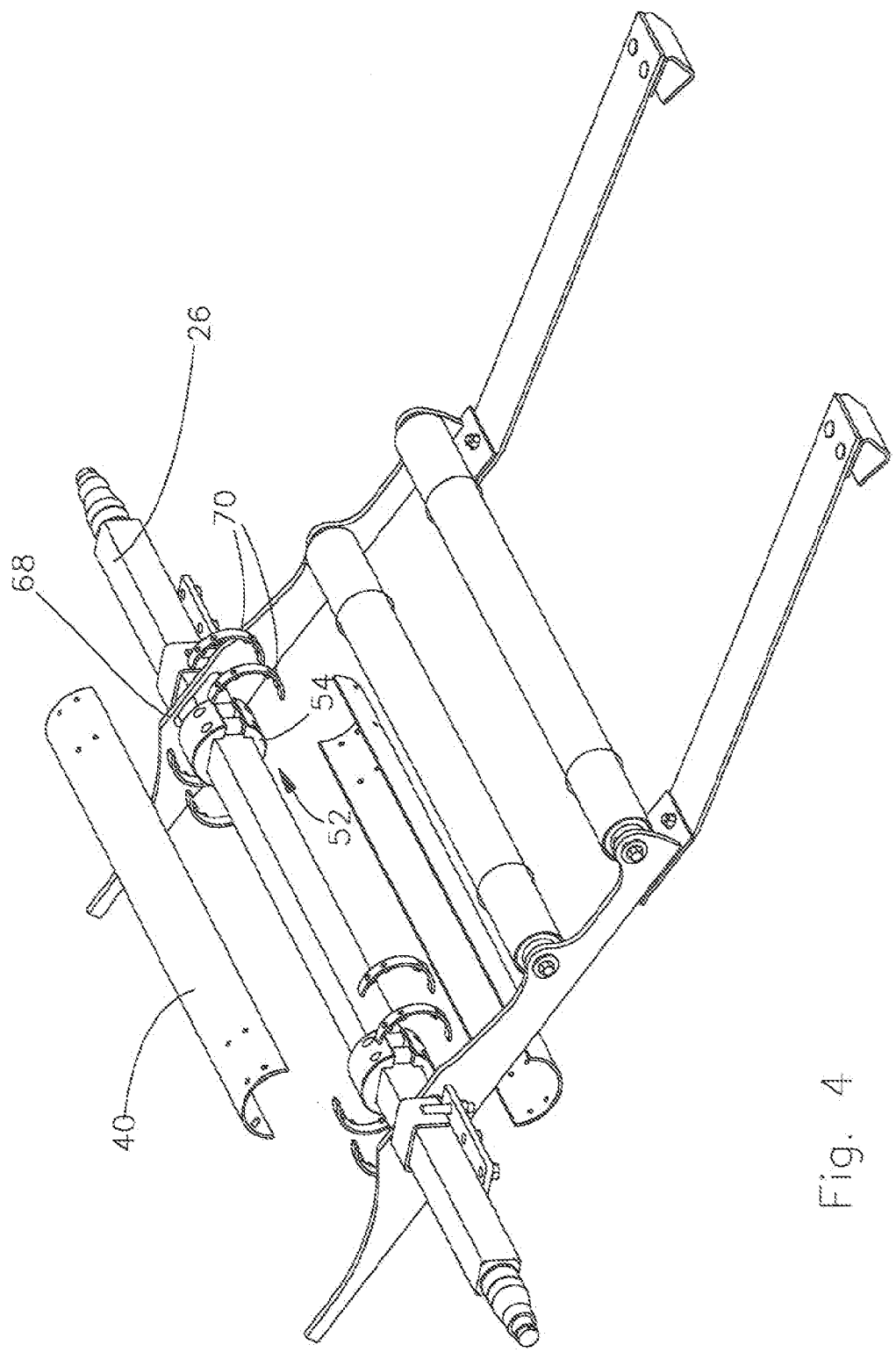
FIG. 4 is a view like FIG. 3, but showing the unloading apparatus mounted to a baler axle, according to a second embodiment, wherein the axle is square in cross section.
Figure 5:
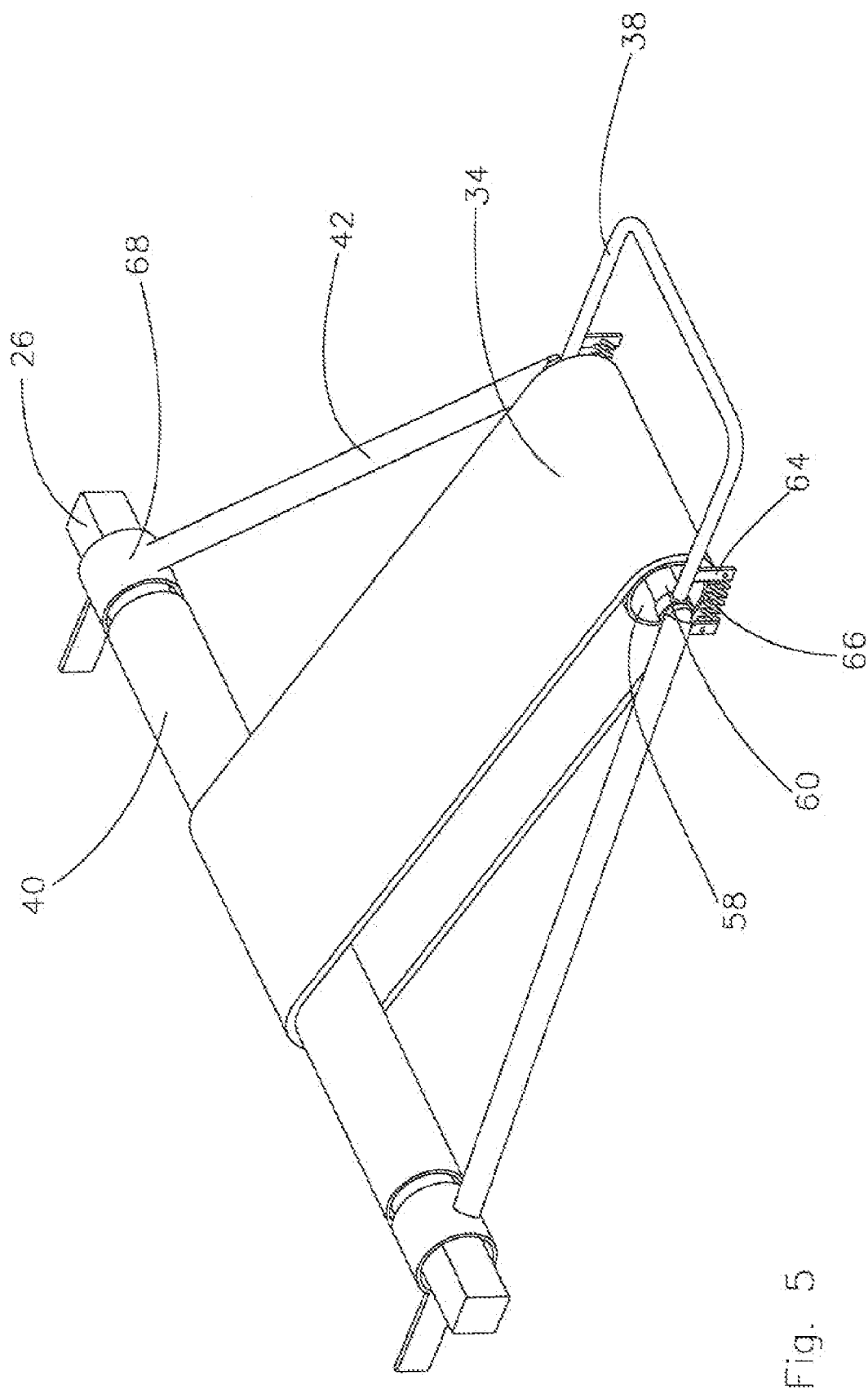
FIG. 5 is a left, rear perspective view of the unloading apparatus according to a third embodiment, wherein a belt is mounted about the cover and a roller at a rear location of the apparatus just ahead of the bumper.

In the illustrative embodiment according to FIGS. 2, 3 and 5, the cover 40 is configured as a tube which encompasses the cross-stay 26 and thus shields this against the round bale. The cover 40 is configured in multipart construction as half-shells and can be joined together in axially running joints 48, for example with a cover plate 50, and can thus be mounted and fitted onto the cross-stray 26 in the radial direction. To enable the cover 40 to rotate with as little friction as possible on the cross-stray 26, bearings 52 are provided, the configuration of which varies according to FIGS. 3, 4 and 5, whereas their function is the same. According to FIG. 3, brackets 54 are provided, which are screwed, clamped or welded onto the cross-stay 26 and rotatably support three rollers 56 in the corner regions of an isosceles triangle, a circumferential circle around the rollers 56 substantially corresponding to the inner circumferential circle of the cover 40. A plurality of bearings 52 are distributed over the length of the cross-stay 26 between the side members 42, so that, depending on the anticipated load, the cover 40 can be securely supported and shielded. According to FIG. 4, bearings 52 configured as plain bearings 54 are provided and like the bearing brackets 54 according to FIG. 3, are clamped to the cross-stay 26. In order to secure the cover 40 axially on the cross-stray 26, axial stops 70, for example rings, are provided, which are connected to the inner face of the cover 40 and bear externally against the bearins 54. In other embodiments of the cover 40, axial stops 70 can also be provided in one way or another According to FIG. 5, the cross-stay 26 is either of round configuration in cross section or an inner tube is slipped onto and fastened to it. The cover 40 thus slides on the externally round cross-stay 26 or on the inner tube surrounding it, so that as large a slide surface as possible is obtained. Common to all these embodiments is that a rotating cover 40 is provided, which shields the relevant static region of the superstructure 12—the cross-stay 26—and is situated between the bale chamber 30 and the unloading apparatus 24.

FIG. 5 shows an embodiment in which the carrying element 34 is realized as a continuous belt or band and which at the front, i.e. nearest to the cross-stay 26, is wrapped around the there-situated cover 40 and at the rear around a return roller 58. The return roller 58 is rotatably mounted in the end regions of the two side members 42, which in this illustrative embodiment do not necessarily converge towards the rear. Other than it is represented, the frame 32 could also be configured equal in width throughout its length. In this illustrative embodiment, the bumper 38 is configured as a horizontal U-bar, which is configured rigidly and not resiliently per se and the free arm ends of which are mounted in a vertically pivotable manner on a pivot axle 60 of the return roller 58. Close to the arm ends, lever arms 64 extend downwards on the bumper 38, which are acted on by springs 66 supported on the other hand, on the side members 42.

In terms of the side members 42, the return roller 58 and the bumper 38, the embodiment according to FIG. 6 is realized the same as in FIG. 5. Although the carrying element 34 is also provided, this now extends beyond the cross-stay 26, is guided in front of the latter around a further return roller 62 and thus accommodates the cross-stay 26 in the enclosed space between its strands. In this embodiment, therefore, the carrying element 34 assumes, at the same time, the function of the cover 40.

The configuration of the carrying elements 34 according to FIG. 5 and/or 6, i.e. as a conveyor belt, constitutes per se an independent invention which is independent of the cover 40.

After all this, it is evident that a round bale discharged from the bale chamber 20 cannot come to bear against a rigid region of the superstructure 12, but rather lands in each case on the cover 40 and thereupon maintains its rotary motion.

The round bale makes its way rotating rearwards and downwards on the carrying element 40 and over the bumper 38 onto the ground and is there prevented from rolling back by the free end of the bumper 38.

Having described the preferred embodiment, it will become apparent that various modifications can be made without departing from the scope of the invention as defined in the accompanying claims.

The invention claimed is:

1. In a round baler having a superstructure defining a bale chamber including a discharge gate and including a bale unloading apparatus coupled to the superstructure in a location for receiving a bale formed in the bale chamber when the discharge gate is moved to a discharge position, the bale developing an original rotary motion during formation within the bale chamber, the unloading apparatus being mounted for pivoting downward for allowing the bale to roll onto the ground, the improvement comprising: said unloading apparatus having at least one carrying element located between the bale chamber and a ground surface, which at least one carrying element permits continued rotary motion of a round bale, said superstructure including a transverse member located so as to be contacted by said bale as the bale moves from the baling chamber to the ground by way of said unloading apparatus; and a movable cover being movably disposed about said transverse member and being movable relative to and independent of said superstructure so as to move when engaged by said bale during discharge of the bale, thereby ensuring that the bale maintains its original rotary motion as the bale rolls onto the ground.

2. The round baler according to claim 1, wherein said transverse member is a cross stay in the form of an axle for wheels of said baler, and said cover being configured as a rotatable tube encircling said axle.

3. The round baler according to claim 2, wherein said cover comprises two shells releasably joined together at a joint extending in a direction extending parallel to said axle.

4. The round baler according to claim 2, wherein said cover is supported with bearings on said axle.

5. The round baler according to claim 1, wherein said unloading apparatus includes at least a second carrying element disposed adjacent said at least one carrying element and which permits a rolling motion of said round bale.

6. The round baler according to claim 1, wherein said at least one carrying element is a continuous belt.

7. The round baler according to claim 5, wherein said at least one and second carrying elements are rolling bodies.

8. The round baler according to claim 6, wherein said continuous belt is wrapped at one end about said cover.

9. The round baler according to claim 6, wherein said continuous belt is wrapped about a return roller mounted on the superstructure.

10. The round baler according to claim 1, wherein said unloading apparatus is mounted for pivoting vertically about a transverse axis and includes an end region extending forward of said axis; and said superstructure having a stop mounted thereto which is engaged by said end region of said unloading apparatus so as to limit downward movement of said unloading apparatus.

11. The round baler according to claim 10, wherein said unloading apparatus includes at least one bumper at a rear delivery end of said unloading apparatus, with said at least one bumper being one of resilient or spring biased.

* * * * *